Patented Sept. 4, 1951

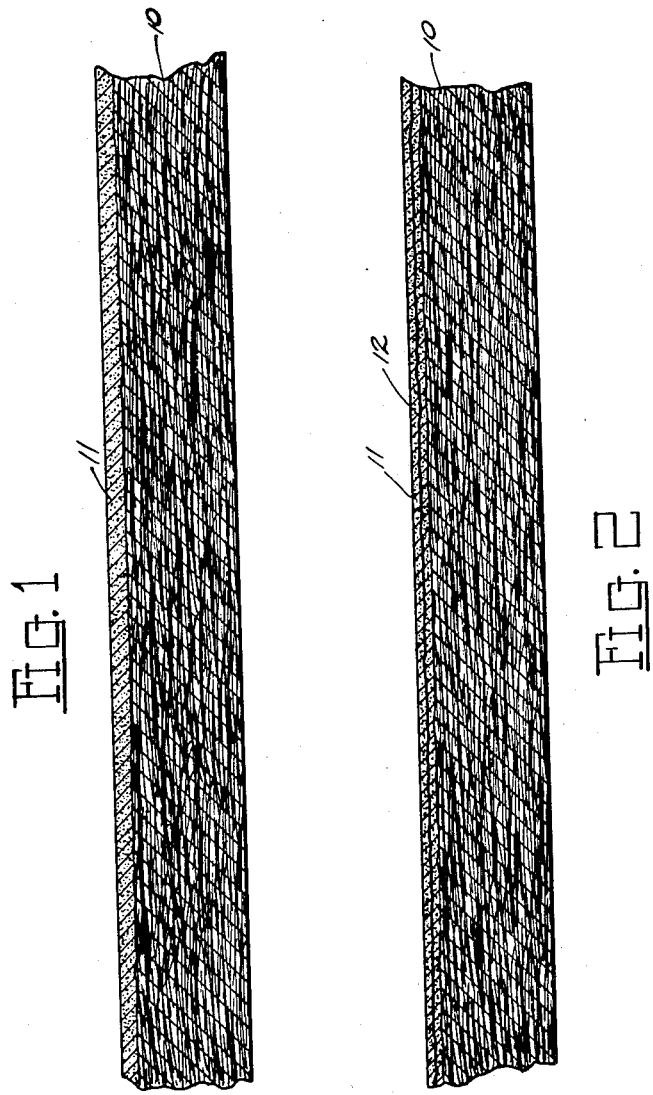

2,566,619

UNITED STATES PATENT OFFICE 2,566,619

INSULATING MATERIAL AND METHOD OF FORMING THE SAME

Herman L. Lyon and Justin R. Boeker, Newark, Ohio, assignors to Owens-Corning Fiberglas Corporation, Toledo, Ohio, a corporation of Delaware Application October 12, 1945, Serial No. 621,936

12 Claims. (Cl. 154—28)

This invention relates to insulation of the type comprising mineral wool, such as rock wool, slag wool, or glass wool, and refers more particularly to improvements in insulating material produced from fibrous glass. The use of glass fibers as a base material is preferred, because glass fibers may be economically produced and are not only very light in weight, but in addition, possess extremely high tensile strength. Thus, it is possible to economically produce a light weight insulation sheet or board of practically any required density having sufficient structural rigidity to enable the same to be readily handled during manufacture and assembly. Such insulation has many and diversified uses. For example, it may be used as a pipe covering, wall covering, lining for heating or cooling ducts, and to form walls of ovens and refrigerators.

An object of this invention is to provide mineral wool insulating board with a relatively hard protective surface characterized in that it is not only impervious to moisture, and fireproof, but in addition, possesses sufficient resiliency to impart good puncture-proof qualities to the insulation. Thus, the life of the insulation is increased and the normally high efficiency of the insulation is maintained, especially in installations where the insulation is employed on exposed surfaces.

Another object of this invention is to provide a surface coating for insulating board composed of a relatively few inexpensive ingredients capable of being easily mixed and economically applied to the insulation. More particularly, it is a further object of this invention to provide a surface coating comprising a mixture having a consistency that may be varied to enable readily applying the same to the insulation by spraying, brushing, or by spreading with a doctor knife or similar equipment. In actual practice, the mixture may be applied by relatively simple, inexpensive equipment employed in conjunction with the insulation forming mechanism so that the cost of application is negligible, especially when considering the advantages realized.

Still another object of this invention is to reinforce the insulating material with a mat of fibrous glass applied to a surface of the insulation and bonded to the latter surface by the protective coating. This arrangement provides an economical and highly effective way in which the insulation may be reinforced in cases where added strength is desired.

A further object of this invention is to provide fibrous glass or mineral wool insulation with a surface capable of being readily painted with casein or other paints congruous with the coating composition.

The foregoing as well as other objects will be made more apparent as this description proceeds, especially when considered in connection with the accompanying drawing, wherein:

Figure 1 is an enlarged diagrammatic sectional view through a sheet of insulation having a surface coating embodying this invention; and Figure 2 is a view similar to Figure 1 showing a reinforcement for the insulating material.

The numeral 10 in Figures 1 and 2 of the drawing indicates an insulating sheet or board comprising glass wool and a suitable binding material for bonding the fibrous glass into an integral mass. Other mineral wool fibers such, for example, as slag or rock wool may be used, but glass wool is preferred because the properties of this material render it possible to obtain a highly effective insulation which is both light in weight and high in structural strength. The particular binding material employed may also be varied in dependence upon the type of insulation required. However, in the majority of cases, any one of the various thermosetting condensation products are satisfactory. Such synthetic resins as phenol formaldehyde and urea formaldehyde or modifications thereof have been successfully used in manufacturing fibrous glass insulating sheets or boards.

The method of making the fibrous glass insulation forms no part of this invention and may be similar to the various methods now in use. Generally stated, streams of molten glass are engaged by a high velocity gaseous blast and attenuated to fine fibers by the blast. The fibers are deposited in a haphazardly arranged mass on a moving belt and a binder of the desired type is applied to the fibers as they are formed. The fibrous mat is then compressed to the desired thickness and/or density and then passed through an oven for curing the binder. This may be accomplished by passing the material between rollers or between caterpillar belts having hot air or the like passing therethrough in order to impart sufficient heat to polymerize the thermosetting agent. The rollers or belt will also hold the bat down to a predetermined fixed dimension as the thermosetting binder hardens.

Regardless of the particular method employed in forming the insulation, it is desirable for at least some applications to provide a moisture resistant surface 11 on the insulation, which is fireproof in that it will not support combustion and resists puncture. These characteristics are especially desirable in installations where the insulating material is applied to exposed surfaces, as is the case when it is used as pipe, oven or wall coverings.

The material of the present invention is composed of four basic ingredients within the following ranges including water 29.50 to 54.50%, casein 5.35 to 5.70%, limestone fines 35 to 59%, and resin 1.90 to 3.75%. To these materials may be added, if desired, a plasticizer, a wetting agent, an accelerator, and a germicide, the latter ingredient serving to prevent the growth of mold or other fungus in the casein.

In preparing the surface covering 11, one typical mixture consists of the following substances in about the proportions stated.

| | Per cent by weight |
|---|---|
| Water | 31.45 |
| Ammonia | .45 |
| Casein | 5.70 |
| Germicide | .20 |
| Resin binder | 1.90 |
| Plasticizer | 3.55 |
| Limestone fines | 56.75 |

The purpose of the ammonia is to dissolve the casein and the quantity or proportion employed in the mixture will depend essentially on the size of the casein grain. Other forms of ammonia may also be used as a solvent to facilitate putting the casein in solution with the diluent or water. For example, aqua ammonia (26° Bé.) or ammonium hydroxide may be successfully used. In some instances, the ammonia may be replaced by a mild alkali such as borax or potash.

Practically any germicide which will act as a mold inhibitor and which will preserve the casein may be used. Satisfactory results have been obtained by using either a water soluble solution of salicylanilide or a water soluble solution of a phenolic compound.

The plasticizer is employed to impart flexibility to the surface covering and to eliminate dryness or brittleness of the latter. The quantity or proportion employed in the mixture depends to some extent on the flexibility required and may vary throughout a wide range. The particular plasticizer used may comprise glycerin, and hydrogenated oil. Although a plasticizer in some proportion is usually desired to impart some degree of resiliency to the surface, nevertheless for some applications, an extermely hard surface may be required. In such cases, the plasticizer may be eliminated entirely.

The binder acts as a stiffening agent and imparts strength to the surface. Various thermosetting condensation products may be used, such for example, as phenol formaldehyde, urea formaldehyde, or various modifications and variations of these synthetic resins. Phenol formaldehyde, originally water soluble, has been found satisfactory for use as a binder in the mixture. When employing phenol condensation products as a binder, it is preferred to use a 70 or 75% solids solution. The resin used polymerizes with the casein when aged or when subjected to heat and provides a strong, semi-rigid surface covering which is highly resistant to warping or shrinkage.

The limestone is preferably introduced into the mix in a pulverized state and acts as a filler. The calcium reacts with the casein and provides a bonding agent for the lime particles to produce a hard mortar or plaster-like surface. The limestone may be replaced with other calcium compounds including burnt lime or whiting, if desired.

The quantity or proportion of either substance may vary over a wide range and depends to some extent on the quantity of casein employed in the mixture.

The quantity of water used depends to a great extent on the manner in which the mixture is to be applied to the insulation. The quantity of proportion noted above provides a mixture having a consistency suitable for application on the insulation by a spreading operation with a doctor knife or other suitable implement. By increasing the quantity of water, it is possible to impart a consistency to the mixture which enables spraying or brushing the same on the insulation.

The various ingredients of the mixture are preferably introduced in the order of their listing noted above, as it is found that such procedure assures obtaining a homogeneous mixture in a minimum length of time. The mixture may be applied to the insulation subsequent to the curing stage for the binder previously applied to the insulation and during continued advancement of the insulation along its path of travel.

After the mixture is spread or otherwise uniformly distributed over the insulation, the latter is conveyed through a heating zone and the mixture or coating is subjected to a temperature of approximately 200° F. for a period of about thirty minutes. This temperature and time interval is sufficient to polymerize the resin with the casein.

The thickness of the surface covering will, of course, vary in dependence upon the amount of mixture applied to the insulation, but for most uses of the insulation, it has been found that a thickness of approximately one-eighth of an inch is satisfactory. Regardless of the exact thickness of the coating, the latter provides a surface on the insulation which is highly resistant to moisture and will not support combustion. Moreover, due to the stiffening agent employed in the mixture, the surface imparts substantial structural strength to the insulation and resists warping or shrinkage. Although the surface is inherently very strong and semi-rigid, nevertheless, the mixture noted above embodies a sufficient quantity of plasticizer to avoid excessive brittleness and thereby the puncture resistance of the surface is increased.

It has been pointed out above that the degree of hardness of the surface may be varied by reducing the quantity of the plasticizer or by eliminating the plasticizer entirely. It was also noted above that the proportion of the ingredients employed in the mix may be varied throughout a wide range, depending upon the characteristics it is desired to impart to the surface covering. One example of a mixture which will provide a hard surface covering for the insulation is as follows:

| | Per cent by weight |
|---|---|
| Water | 54.50 |
| Casein | 5.85 |
| Accelerator (ammonium hydroxide) | .40 |
| Wetting agent | 1.75 |
| Synthetic resin (70% solids solution) | 2.35 |
| Germicide | .20 |
| Filler (limestone or whiting) | 34.95 |

The above ingredients, mixed in substantially the proportions noted, provide a relatively thin mixture and are employed in instances where it is desired to penetrate the insulation with the mixture and to impart adhesive characteristics to the surface covering. The wetting agent serves to break down the surface tension and improve the penetrating characteristics of the mixture.

An inexpensive wetting agent such, for example, as oleate soap chips or aerosol is preferred, although other wetting materials may be used.

Another mixture which provides a strong, hard surface covering, but is somewhat heavier than the above mixture is as follows:

| | Per cent by weight |
|---|---|
| Water | 47.10 |
| Casein | 5.35 |
| Accelerator (aqua ammonia 26° Bé.) | .40 |
| Germicide | .25 |
| Resin (urea formaldehyde 75% solids solution) | 3.75 |
| Zinc sulphate (technical) | .30 |
| Filler (limestone or whiting) | 42.85 |

The zinc sulphate in the above mixture reacts with the casein in conjunction with the resin to impart increased strength to the surface coating and is particularly suitable for use in connection with wall boards or the like.

If desired, the coating may be reinforced with glass fibers either arranged in mat form or woven to form a cloth indicated in Figure 2 of the drawing by the reference character 12. Although other types of fibers may be employed, it is preferred to use glass fibers because the strength-weight ratio of glass fibers is substantially greater than that of other fibers and because glass fibers may be economically produced. The fibers in the mat or cloth reinforcement may be bonded together by a suitable resinous binder similar to those previously defined before the reinforcement is applied to the insulating board, or the actual coating mixture described above may be used as a binder for the fibers. In either case, the reinforcement is placed on the board before the mixture is applied, so that the mixture soaks through the reinforcement and penetrates the adjacent surface of the insulation.

The reinforcing member is relatively thinner than the thickness of the coating applied to the board and is concealed by the latter. Thus, the reinforcement is, in effect, embedded in the surface covering 11 and is integrally united to the covering material during curing of the latter. The use of a reinforcement in the surface covering is especially advantageous in installations where it is desirable to impart unusual structural strength to the insulation as in wall coverings or in applications where the insulation is required to support a considerable weight.

Various modifications may be resorted to within the spirit of the invention and the scope of the claims.

We claim:

1. As a product of manufacture, a body of insulating material embodying fibrous glass in board form and having an integrated layer on at least one side of said board, which is approximately ⅛ inch in thickness comprising a mixture of substantially 5.35 to 5.70% by weight of casein, 35 to 59% of limestone fines, and 1.90 to 3.75% of a thermosetting condensation product selected from the group consisting of phenol-formaldehyde and urea formaldehyde.

2. The method of making mineral wool insulation with a hard impervious surface covering which comprises applying to a surface of the insulation a mixture containing 5.35 to 5.70% by weight of casein with 29.50 to 54.50% of water, 35 to 59% of limestone fines, .40 to .45% of ammonia, and 1.90 to 3.75% of a thermosetting synthetic resin selected from the group consisting of phenol formaldehyde and urea formaldehyde, to provide a coating for the latter and then curing the coating at elevated temperature in the range of about 200° F. to polymerize the resin with the casein and to drive off the ammonia and moisture.

3. A method of making a hard surfaced glass fiber insulation of low density which comprises covering at least one wall of an insulating layer of bonded glass fibers with a thin glass fiber fabric, applying a composition over the fabric which consists essentially of casein, lime, and water soluble phenol formaldehyde resin and water present in the ratio of 5.4–5.7 parts by weight casein, 35.0–59.0 parts by weight finely divided limestone, 1.9–3.7 parts by weight resin and 30.0–54.0 parts by weight water, and reacting the composite mass at elevated temperature to harden the casein and resin and to drive off the water.

4. A product of manufacture comprising an insulating layer of glass fibers and a surface layer on one side of the insulating layer comprising 5.4–5.7 parts by weight casein, 35.0–59.0 parts limestone in finely divided form, and 1.9–3.7 parts by weight resin selected from the group consisting of phenol formaldehyde and urea formaldehyde.

5. A product of manufacture comprising an insulating layer of glass fibers having an outer layer integrated therewith comprising a plasticizer, 5.4–5.7 parts by weight casein, 35.0–59.0 parts by weight limestone in finely divided form, and 1.9–3.7 parts by weight resin selected from the group consisting of phenol formaldehyde and urea formaldehyde.

6. A product of manufacture comprising an insulating layer with glass fibers having a surface layer comprising a germicide, 5.4–5.7 parts casein, 35.0–59.0 parts by weight limestone in finely divided form, and 1.9–3.7 parts by weight resin selected from the group consisting of phenol formaldehyde and urea formaldehyde.

7. A product of manufacture comprising an insulating layer comprising glass fibers having a surface layer comprising 5.4–5.7 parts by weight casein, 35.0–59.0 parts by weight limestone in finely divided form, 1.9–3.7 parts by weight resin selected from the group consisting of phenol formaldehyde and urea formaldehyde, and a thin fabric of glass fibers imbedded within the surface layer.

8. The method for making a hard surfaced glass fiber insulation of a low density which comprises coating at least one wall of an insulating layer of glass fibers with an aqueous composition comprising the following materials present in the ratio of 5.4–5.7 parts by weight casein, 35.0–59.0 parts by weight finely divided limestone, 1.9–3.7 parts by weight resin selected from the group consisting of phenol formaldehyde and urea formaldehyde, and reacting the composite mass at elevated temperature to harden the casein and resin.

9. The method for making a hard surfaced glass fiber insulation of low density which comprises coating at least one wall of an insulating layer of glass fibers with a composition comprising 5.4–5.7 parts by weight casein, 35.0–59.0 parts limestone in finely divided form, 1.9–3.7 parts by weight resin selected from the group consisting of phenol formaldehyde and urea formaldehyde, and 30.0–54.0 parts by weight water, and reacting the composite mass at elevated temperature to harden the casein and resin and eliminate the free water.

10. The method as claimed in claim 9 in which the coating composition contains a plasticizer.

11. The method as claimed in claim 9 in which the coating composition contains a wetting agent.

12. The method as claimed in claim 9 in which the coating composition contains a small amount of ammonium hydroxide to solubilize the casein in the coating composition.

HERMAN L. LYON.
JUSTIN R. BOEKER.

REFERENCES CITED

The following references are of record in the file of this patent:

UNITED STATES PATENTS

| Number | Name | Date |
|---|---|---|
| 942,699 | Baekland | Dec. 7, 1909 |
| 1,465,389 | Fisher | Aug. 21, 1923 |
| 1,649,110 | Greenstein | Nov. 15, 1927 |
| 1,852,706 | Eisenstein | Apr. 5, 1932 |
| 1,924,514 | Redman | Aug. 29, 1933 |
| 2,061,570 | Wiezevich | Nov. 24, 1936 |
| 2,108,682 | Leslie | Feb. 15, 1938 |
| 2,195,272 | Ehlers | Mar. 26, 1940 |
| 2,343,601 | Weimann | Mar. 7, 1944 |
| 2,373,401 | King | Apr. 10, 1945 |
| 2,393,947 | Ximenez | Jan. 29, 1946 |
| 2,414,125 | Rheinfrank | Jan. 14, 1947 |

OTHER REFERENCES

"The Architectural Forum" November 1942, page 116.

Sutermeister and Browne, "Casein and Its Industrial Applications"; Reinhold Pub. Corp., N. Y. 1939.